US007689700B2

(12) United States Patent
McNeil et al.

(10) Patent No.: US 7,689,700 B2
(45) Date of Patent: Mar. 30, 2010

(54) CONFIGURATION OF A PEER GROUP

(75) Inventors: Brian McNeil, Kirkland, WA (US);
Steve Seixeiro, Snohomish, WA (US);
Jerry K. Koh, Redmond, WA (US);
Andrew V. Davidson, Kirkland, WA
(US); Anshul Rawat, Kirkland, WA
(US); Daniel Oliver, Seattle, WA (US);
Michael G. Sheldon, Seattle, WA (US);
Michael McCormack, Bellevue, WA
(US); Ram Ramasubramanian,
Bellevue, WA (US); Tracy Schultz,
Seattle, WA (US); Giles van der Bogert,
Renton, WA (US)

(73) Assignee: Microsoft Corporation, Redmond, WA (US)

( * ) Notice: Subject to any disclaimer, the term of this patent is extended or adjusted under 35 U.S.C. 154(b) by 162 days.

(21) Appl. No.: 11/971,020

(22) Filed: Jan. 8, 2008

(65) Prior Publication Data
US 2009/0177790 A1 Jul. 9, 2009

(51) Int. Cl.
*G06F 15/16* (2006.01)
(52) U.S. Cl. .................. 709/229; 709/205; 713/151
(58) Field of Classification Search ......... 709/204–207; 713/155–181
See application file for complete search history.

(56) References Cited

U.S. PATENT DOCUMENTS

| 6,421,768 | B1 | 7/2002 | Purpura |
| 7,085,925 | B2 | 8/2006 | Hanna |
| 7,130,621 | B2 | 10/2006 | Blawat |
| 7,206,841 | B2 | 4/2007 | Traversat |
| 7,206,934 | B2 | 4/2007 | Pabla |
| 2002/0147810 | A1* | 10/2002 | Traversat et al. ............ 709/224 |
| 2003/0055892 | A1 | 3/2003 | Huitema |
| 2003/0056093 | A1* | 3/2003 | Huitema et al. ............. 713/156 |
| 2003/0163697 | A1* | 8/2003 | Pabla et al. ................. 713/171 |
| 2003/0204734 | A1 | 10/2003 | Wheeler |
| 2004/0064511 | A1* | 4/2004 | Abdel-Aziz et al. ......... 709/206 |
| 2004/0064512 | A1* | 4/2004 | Arora et al. ................ 709/206 |
| 2004/0111645 | A1 | 6/2004 | Baffes |
| 2004/0148333 | A1 | 7/2004 | Manion |

(Continued)

OTHER PUBLICATIONS

International Search Report, PCT/US2008/086664, Mailing Date: Jun. 24, 2009, Korean Intellectual Property Office, Government Complex-Daejeon, 139 Seonsa-ro, Seogu, Daejeon 302-701, Republic of Korea.

(Continued)

*Primary Examiner*—Salad Abdullahi
(74) *Attorney, Agent, or Firm*—Shook, Hardy & Bacon L.L.P.

(57) ABSTRACT

Embodiments of the present invention relate to systems and methods for configuring computing devices to join a peer group. A peer group may be created on a subnetwork by a computing device. When a new computing device enters the subnetwork, it may join the peer group and be given access to the shared resources on the peer group and associated computing devices, using a communications layer and an authorization layer. Allowing a new computing device to join a peer group includes inviting the new device to join and then challenging the device for a passkey of the peer group. After joining the peer group, the computing device will be able to access and share resources with the peer group and other computing devices associated with the peer group.

16 Claims, 4 Drawing Sheets

U.S. PATENT DOCUMENTS

| | | | |
|---|---|---|---|
| 2004/0210767 | A1 | 10/2004 | Sinclair |
| 2005/0086300 | A1* | 4/2005 | Yeager et al. ............... 709/204 |
| 2006/0059341 | A1 | 3/2006 | Dharmadhikari |
| 2006/0155802 | A1 | 7/2006 | He |
| 2006/0156390 | A1 | 7/2006 | Baugher |
| 2006/0224890 | A1 | 10/2006 | Zhou |
| 2007/0162963 | A1 | 7/2007 | Penet |
| 2007/0174410 | A1 | 7/2007 | Croft |
| 2007/0223398 | A1 | 9/2007 | Luo et al. |

OTHER PUBLICATIONS

How to Enable Single Sign-On for my Terminal Server Connections, http://blogs.msdn.com/ts/archive/2007/04/19/how-to-enable-single-sign-on-for-my-terminal-server-connections.aspx.

Connecting to the Internet Securely; Protecting Home Networks, http://www.ciac.org/ciac/documents/CIAC-2324_Connecting_to_the_Internet_Securely_Protecting_Home_Networks.pdf, Nov. 27, 2002.

Microsoft Windows XP Professional, http://www.dtrbus.com/libr/ms-xpadv.pdf, Aug. 2001.

Enterprise Single Sign on Solutions, http://www.actividentity.com/solutions/technology/esso_overview.php, Oct. 19, 2007.

Bruno Richard, Donal Mac Nioclais, Denis Chalon, "Clique: A transparent, Peer-to-Peer collaborative file sharing system", Oct. 28, 2002, http://66.102.1.104/scholar?hl=en&lr=&q=cache:TqlFOULYEosJ:www.hwswworld.com/downloads/9_13_05_a_pdfs/HPL-2002-307.pdf, hp Laboratories, France.

P2P Computing, http://64.233.183.104/search?q=cache:YbgE2r_iwBgJ:www.srdc.metu.edu.tr/webpage/seminars/p2p/P2P.ppt, Oct. 18, 2007.

Fredrik Espinoza, Lucas Hinz, "Generic Peer-to-Peer Support for a Personal Service Platform," http://64.233.183.104/search?q=cache:KDsStkX_-xwJ:www.sics.se/~-espinoza/documents/saint2003.pdf, Swedish Institute of Computer Science, Kista, Sweden.

Emir Halepovic, "Performance Evaluation and Benchmarking the JXTA Peer-to-Peer Platform," Aug. 2004, http://64.233.183.104/search?q=cache:th7YeEm7j-IJ:library2.usask.ca/theses/submitted/etd-08132004-120924/unrestricted/Halepovic-JXTA.pdf, University of Saskatchewan.

\* cited by examiner

CONFIGURATION OF A PEER GROUP

BACKGROUND

Typically, sharing resources between computing devices requires a lot of effort on the part of the user of each device to configure each computing device to both share resources (and determine which resources to share) and to access resources from other devices. It further subjects each user to undue security risks. Allowing computing devices to join a peer group, for example, when at a home location, can provide an easier method of sharing resources, while retaining security. A peer group may be particularly helpful to a user when the user operates multiple computing devices and would like to share resources between the devices.

SUMMARY

Embodiments of the present invention relate to systems and methods for configuring computing devices to join a peer group. A peer group may be created on a subnetwork by a computing device. When a new computing device enters the subnetwork, it may join the peer group and be given access to the shared resources on the peer group and associated computing devices. Allowing a new computing device to join a peer group includes inviting the new device to join and then challenging the device for a passkey of the peer group.

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
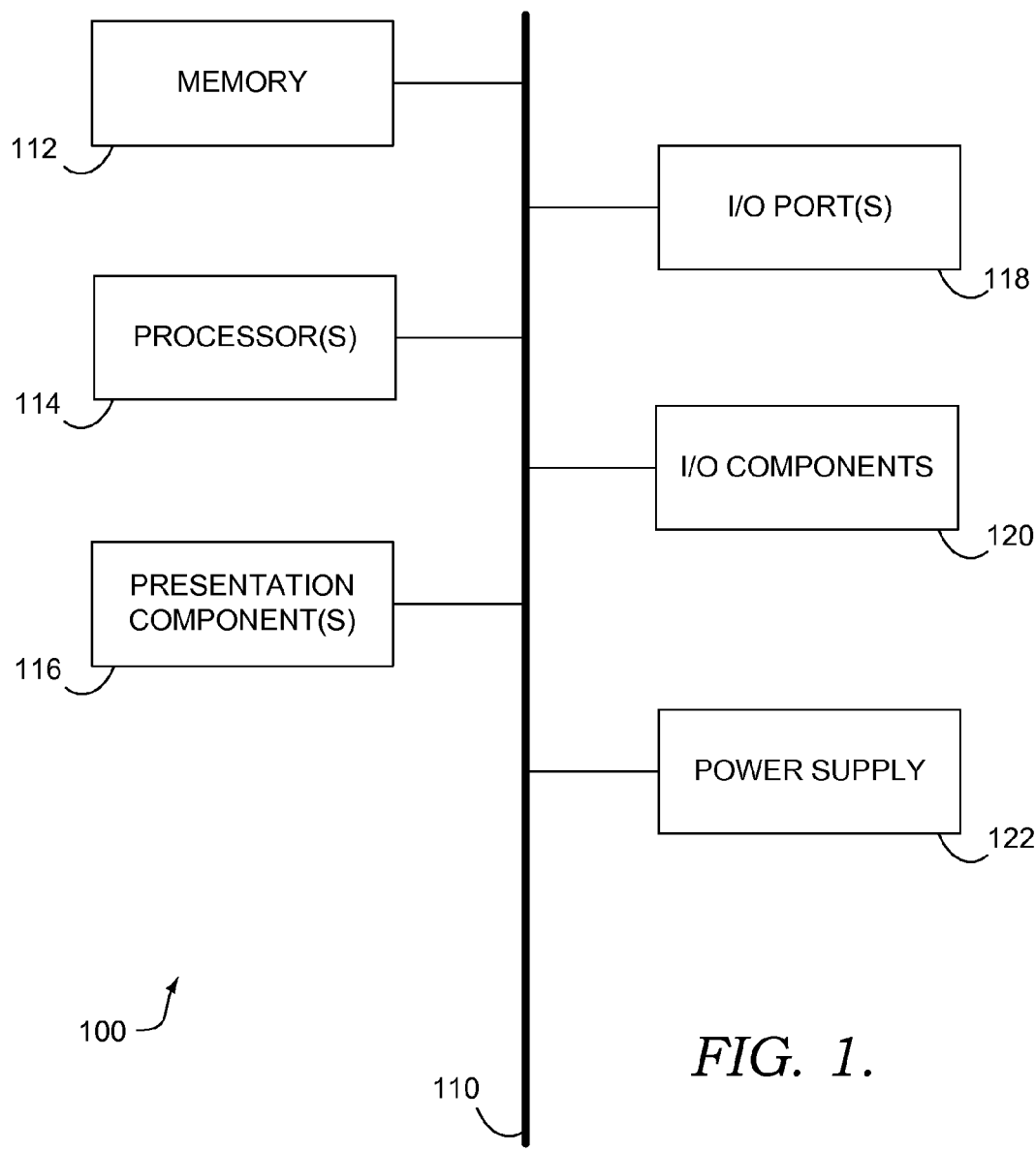
FIG. 1 is a block diagram of a computing system environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Systems and methods for configuring computing devices to join a peer group are provided. In embodiments of the invention, a peer group has been created by an existing computing or user device, where the peer group resides on a subnetwork. If a new computing device enters the same subnetwork (e.g., behind the same routing device), the new computing device may be invited to join the peer group using a communications layer and will be authenticated after entering the passkey of the peer group using an authorization layer. Once the new computing device has joined the peer group, it will be able to access resources residing on the peer group, such as resources associated with other computing devices in the peer group. Conversely, other computing devices in the peer group will be able to access resources associated with the new computing device. The communications layer also serves to transport data between the computing devices in the peer group.

In one embodiment of the present invention, one or more computer storage media is provided for performing a method for configuring a peer group, where an existing user device resides on the peer group. The method comprises, in part, sending a request to join the peer group to a new user device; challenging the new user device for a passkey; receiving a passkey from the new user device; determining whether the received passkey is correct; and if the passkey received from the new user device is correct, allowing the new user to join the peer group.

In another embodiment of the present invention, a system of a plurality of computing devices configured to reside in a peer group is provided. The system comprises, in part, an existing user device in a peer group residing on a subnetwork; and a new user device residing on the subnetwork, where an authorization layer authenticates the new user device and allows the new user device to join the peer group, and where a communications layer connects the new user device to the peer group.

In yet another embodiment of the present invention, one or more computer storage media for performing the method for configuring a new user device to join a peer group is provided. The method comprises, in part, receiving a request to join a peer group of computing devices from an existing user device in the peer group; sending an acceptance to the request to the existing user device; receiving a challenge for a passkey from the existing user device; sending the correct passkey to the existing user device; and joining the peer group with the existing user device.

Having briefly described an overview of embodiments of the present invention, an exemplary operating environment suitable for use in implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the illustrated computing environment be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty-computing devices, and the like. Embodiments of the present invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (1/0) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CD-ROM, digital versatile discs (DVD) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disk drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game advertisement, satellite dish, scanner, printer, wireless device, and the like.

Figure 2:
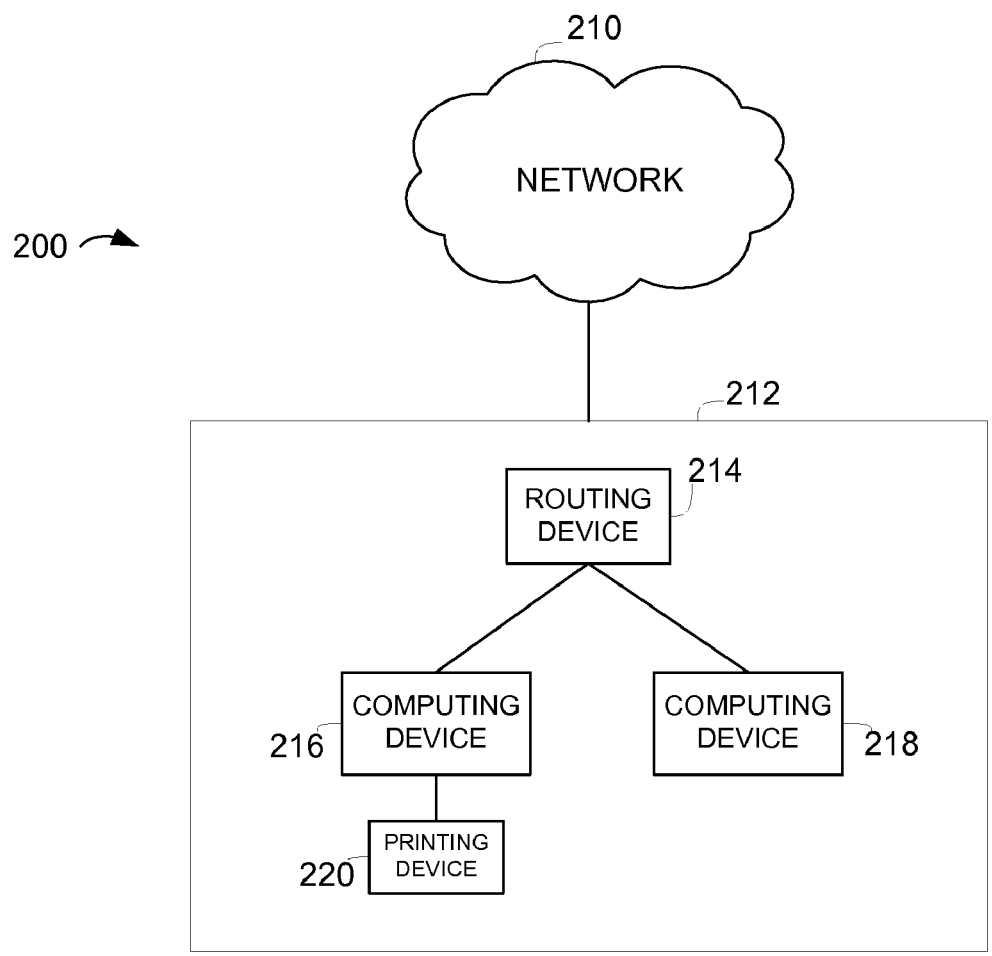
FIG. 2 is a block diagram illustrating an exemplary system for configuring a peer group, in accordance with the invention.

Turning now to FIG. 2, a block diagram is illustrated that shows an exemplary computing system 200 configured for use in implementing embodiments of the present invention. It will be understood and appreciated by those of ordinary skill in the art that the computing system 200 shown in FIG. 2 is merely an example of one suitable computing system and is not intended to suggest any limitation as to the scope of use or functionality of the present invention. Neither should the computing system 200 be interpreted as having any dependency or requirement related to any single component/module or combination of components/modules illustrated herein.

Computing system 200 includes a network 210 and a peer group 212, in communication with one another. The network 210 may include, without limitation, one or more local area networks (LANs) and/or wide area networks (WANs). Such networking environments are commonplace in offices, enterprise-wide computer networks, intranets, and the Internet. Accordingly, the network 210 is not further described herein.

Peer group 212 comprises a plurality of computing devices 216, 218. Computing device 216 and computing device 218 shown in FIG. 2 may be any type of computing device, such as, for example, computing device 100 described above with reference to FIG. 1. By way of example only and not limitation, computing devices 216 and 218 may be a personal computer, desktop computer, laptop computer, server computer, handheld device, mobile handset, consumer electronic device, networked computer peripherals, and the like. In one embodiment of the present invention, computing devices 216 and 218 are connected to the routing device 214 via a wired or wireless connection. One skilled in the art will appreciate and understand that peer group 212 may contain a plurality of computing devices, and is not limited to computing devices 216 and 218.

A routing device 214 is also illustrated in FIG. 2, which provides a connecting device between computing devices 216 and 218. Routing device 214 allows for wired or wireless connections between computing devices 216 and 218. In FIG. 2, routing device 214 serves a residential gateway for peer group 212 by providing port translations and thus allowing multiple computing devices (e.g., computing devices 216 and 218) to share one IP address and Internet connection. Routing device 214 may sit between the modem and internal network, but routing device 214 may also be integrated into a modem connected to network 210 or a higher level of network 210. In embodiments, routing device 214 combines the function of port translator, a multi-port Ethernet switch, and a WiFi access point. Alternatively, routing device 214 may be any combination of a switch, hub, wireless access point, or a dynamic host configuration protocol computing device. Further, routing device 214 may provide a border between sub-networks. A subnetwork is a range of logical addresses within the address space assigned to an organization. Accordingly, because computing devices 216 and 218 reside behind routing device 214, they are located on the same subnetwork. It will be understood and appreciated, however, that routing device 214 is not a part of peer group 212, and instead is merely a part of the networking equipment of peer group 212. One will further appreciate that any network equipment (e.g., network switches, hubs, wireless access points, etc.) may be used with peer group 212 and is within the scope of this invention.

In FIG. 2, computing devices 216 and 218 have the capability of identifying their location (e.g., home, work, public, etc.). That is, the computing devices have location awareness. This capability allows a computing device to identify its location on every network the device is connected to, and more specifically, whether the computing device is in its home network. Location awareness is important in the security of a computing device. For example, if a computing device is located at a public location, the computing device will be less likely to share resources or allow other devices to access its resources. But, if a computing device identifies itself as being in its home location, it will be more likely to allow such access.

In embodiments of the invention, peer group 212 resides in a home location. After it has been determined that a computing device is in the home location, the computing device will create a passkey for the peer group if it is the first computing device in the home. Alternatively, if it is not the first computing device, it will be challenged to enter the passkey of the peer group, which joins the computing device to the other computing devices in the peer group. For example, if computing device 216 is the first computing device in peer group 212, it may be referred to as the existing user device or existing user, and computing device 216 would create a passkey for peer group 212. Subsequently, if computing device 218 were to enter peer group 212, it would be a new user device or new user, and would enter the passkey created by computing device 216. Once a passkey is created, any device that obtains and enters the passkey, and further is located on the same subnetwork as peer group 212, has the capability of becoming a member of the group. Once computing devices 216 and 218 are both members of peer group 212, the devices can share resources (e.g., sharing of printing device 220, accessing files, etc.).

Within peer group 212, a communications or bootstrap layer links all computing devices, such as computing device 216 and 218, and transports the data shared between devices joined to the peer group. In embodiments of the present invention, peer group 212 is created on a link-local scope, which is tied to the local subnetwork. In such embodiments, to determine which computing devices have membership in the peer group, an invitation is sent out on the local subnetwork, and thus on the link-local scope. This requires a computing device to be located on the subnetwork and to have identified the subnetwork as its home location to receive an invitation. In other embodiments, a peer group may be on a global scope, and then the existence of the global peer groups may be resolved by requiring users to identify their peer group (for example, by name).

Once an invitation to join the peer group is received, the computing device is invited to join and challenged for the passkey to join the peer group. This challenge is sent via an authorization layer. If the computing device enters the correct passkey, it will gain entry into the peer group and will have access to the data stored within on other computing devices. In one embodiment, upon joining the peer group, the computing device can designate which resources (e.g., devices, folders, files, etc.) it chooses to make visible to other members of the peer group by, for example, displaying a user interface providing a list of folders contained on the computing device.

In embodiments of the present invention, the passkey required to enter peer group 212 is an alpha numeric value of at least eight characters. One skilled in the art will appreciate that, to strengthen the passkey and thus the security of the peer group, another piece of unique information beyond the passkey may be required, and that, by requiring more than just the passkey, the peer group 212 receives more protection, for example, from simple dictionary attacks. Moreover, all data within peer group 212 may be encrypted. The authorization layer is further used to manage the security of the peer group 212.

When a computing device, such as computing device 216, first creates peer group 212, a set of unique credentials is created for all computing devices that are in the peer group or will join the peer group. Every computing device that joins peer group 212 creates a local non-interactive user account with an alpha username and password. Such a local user account allows a computing device to maintain an association with the other computing devices located on the subnetwork that also contain the common set of credentials regardless of the particular user utilizing the computer device.

Computing devices 216 and 218 may comprise various resources for use by the peer group. For example, computing device 216 is associated with printing device 220 in FIG. 2.

One skilled in the art will appreciate that printing device 200 may include any suitable device that produces a hard copy of a document stored in electronic form, usually on a physical media such as paper. Exemplary printing devices include toner-based printers, liquid inkjet printers, solid ink printers, dye-sublimation printers, inkless printers, dot-matrix printers, line printers, pen-based printers, thermal printers, and the like. In addition to printing devices, computing devices 216 and 218 may also be associated with computer readable media, which includes the types of computer readable media discussed above in relation to computing device 100 in FIG. 1.

Computer readable media and printing devices are examples of resources that may reside on or be associated with a computing device, such as computing devices 216 and 218. One skilled in the art will understand and appreciate that these resources, and those resources shown in FIG. 2, are not limiting on the invention. The invention may incorporate any resource that has the capability of being accessed and shared in a peer group. Additional resources may include fax devices, copy devices, scanning devices, presentation devices, display devices, computer storage media, DVD devices, CD devices, optical storage devices, hard disk drive devices, audio input devices, audio output devices, connectivity devices, gaming devices, and the like.

In one embodiment of the present invention, the resources available to the computing devices of a peer group are not limited to resources that have been selected as being accessible, for example, when a user selects which resources or folders it desires to share with a peer group when it enters the peer group. Rather, the various resources residing on or associated with computing devices in a peer group are accessible without having to be specifically identified as such. Thus, the resources will by default be shared within the peer group. The configuration of this embodiment allows for ease of use by users operating the computing devices that desire to join a peer group. So, for example, if a user has a printer associated with one computer, such as a desktop computer, in his home, and also uses a laptop computer, then, when the laptop computer joins the peer group with the desktop and is configured by the peer group, the user may print from his laptop with little effort since the printer will by default be accessible by the laptop in the peer group.

Figure 3:
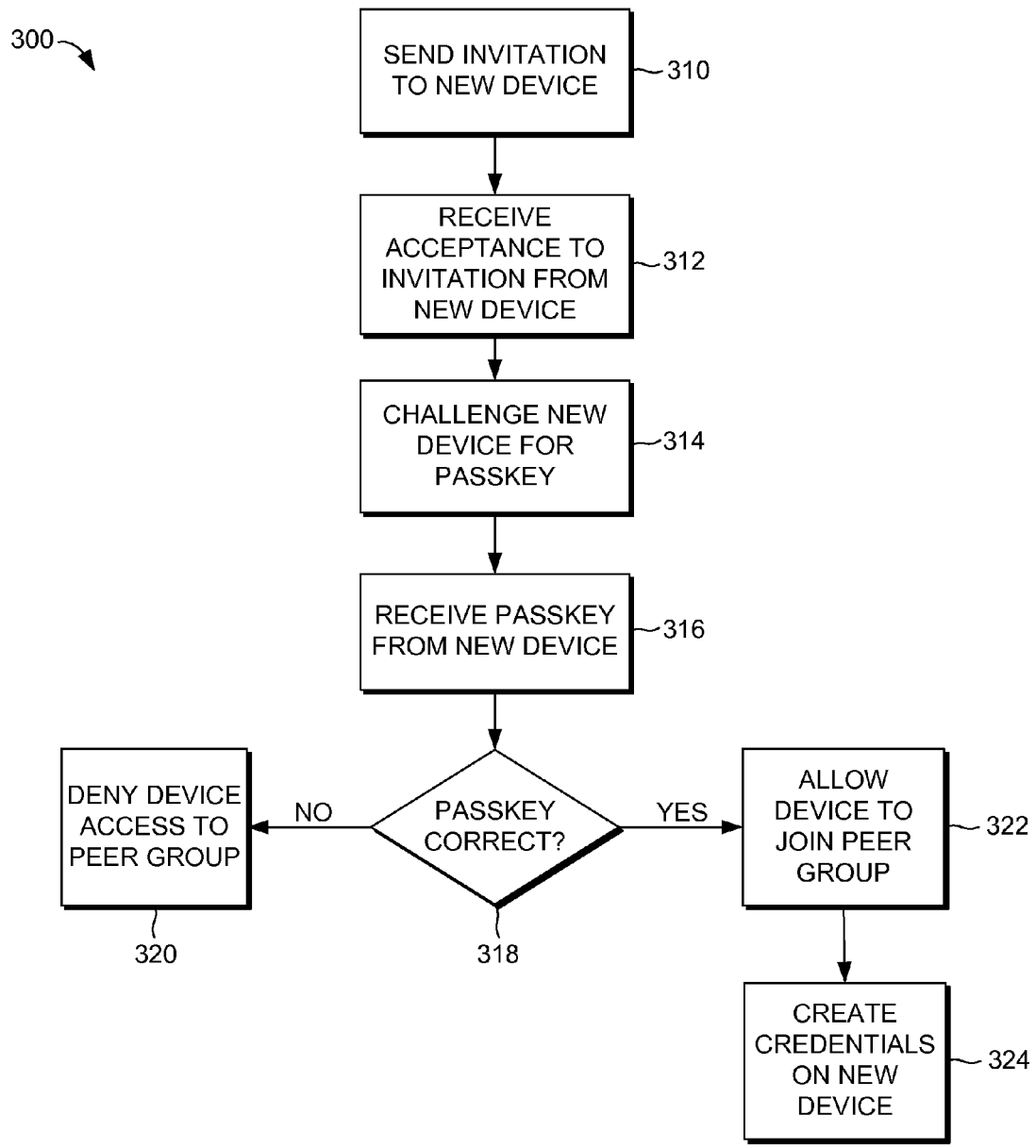
FIG. 3 is a flow diagram illustrating a method for configuring a peer group, in accordance with the present invention.

Referring now to FIG. 3, a flow diagram is provided that illustrates a method 300 for configuring a peer group, in accordance with embodiments of the present invention. In this example, a peer group exists that comprises at least one existing computing device, and a new computing device has entered the local subnetwork of the peer group. More specifically, the new computing device identifies the subnetwork as its home location. Accordingly, at block 310, an invitation to join the peer group is sent by the existing computing device (e.g., computing device 216 in FIG. 2) to a new computing device (e.g., computing device 218 in FIG. 2). The new computing device opens its firewall port to enable the discovery of the invitation, and then looks for the invitation. If an invitation is detected and the new computing device desires to join the peer group, it will send an acceptance of the invitation back to the existing computing device. The existing computing device will receive this acceptance at block 312.

At block 314, the new computing device is challenged for the passkey created by the existing computing device when creating the peer group, as discussed above. Upon receiving the challenge, the new computing device enters a passkey, and the entered passkey is received by the existing computing device at block 316. At block 318, it is determined whether the entered passkey is correct. If not, at block 320, the new computing device is denied access to the peer group. If the computing device has entered the correct passkey, then at block 322, the computing device is allowed to join the peer group. After the computing device has joined the peer group, the device is further configured to access resources and to share resources in the peer group. For example, the firewall of the new computing device may be opened to other computing devices on the peer group. Also, network discovery and file sharing is enabled for the new computing device. Continuing to block 324, the existing computing device on the peer group circulates credentials to the new computing device, and the new computing device receives such credentials. The new computing device further creates a local user account, as discussed above.

Figure 4:
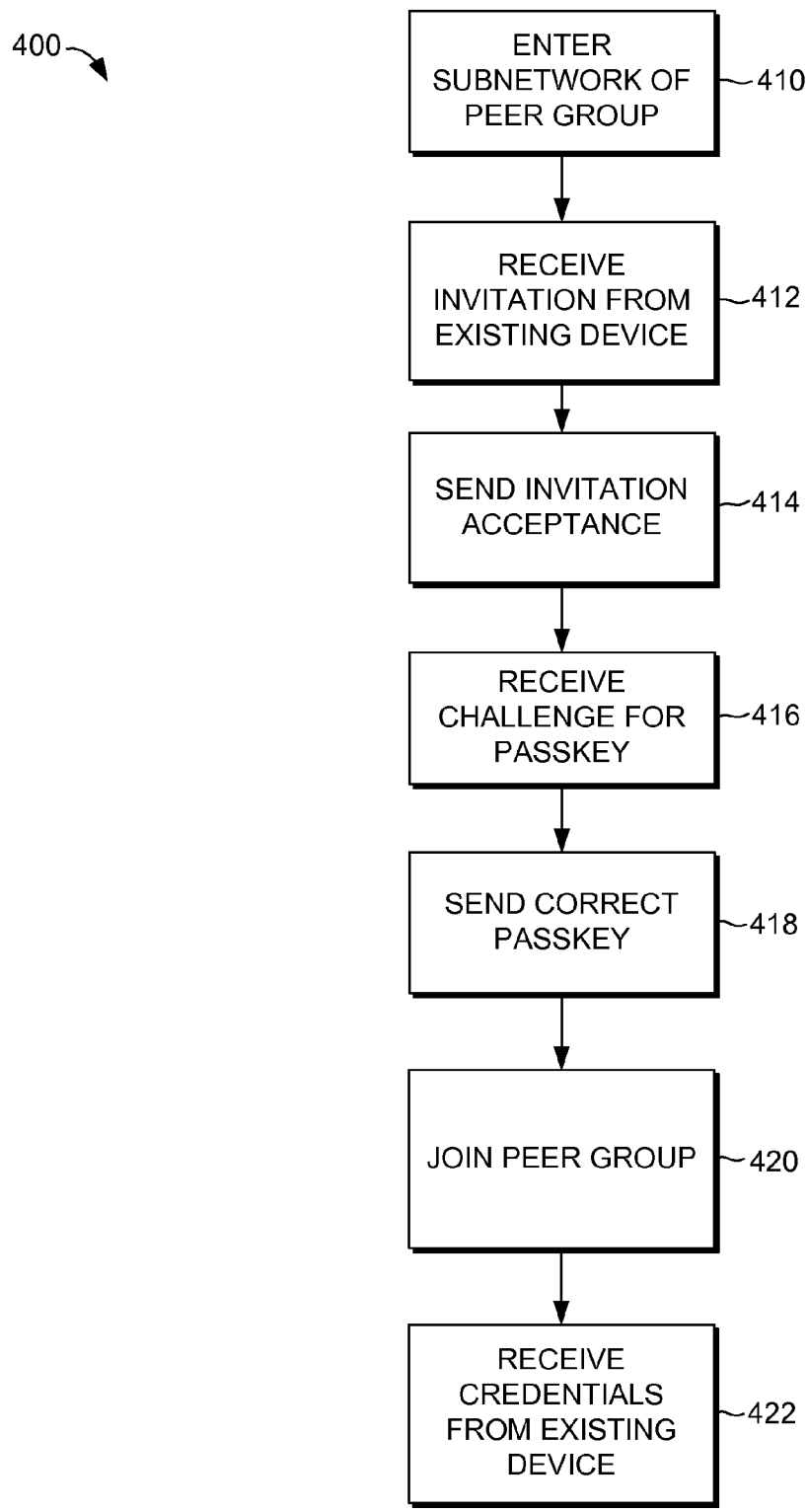
FIG. 4 is a flow diagram illustrating another method for configuring a peer group, in accordance with the present invention.

Turning now to FIG. 4, a flow diagram illustrating an exemplary method 400 of configuring a new computing device to join a peer group, in accordance with embodiments of the present invention, is shown. In this example, the peer group already includes an existing computing device that has created the peer group. At block 410, a new computing device (e.g., computing device 218 in FIG. 2) enters the subnetwork of the peer group. This may occur, for example, when a user buys a new laptop computer and uses the laptop in their house with a peer group, which includes an existing desktop computer. Upon entering the subnetwork, if the new computing device identifies the subnetwork as its home location, it opens its firewall port to enable discovery of an invitation to join the peer group and searches for such an invitation.

If an existing computing device has sent an invitation to join the peer group to the new computing device, the new computing device receives the invitation at block 412, and at block 414, the new computing device sends an invitation acceptance to the existing computing device. Consequently, the new computing device receives a challenge for a passkey to the peer group at block 416 and enters the correct passkey at block 418. Once the new computing device has been authenticated, the device joins the peer group at block 420.

As discussed above, after the new computing device has joined the peer group, it may then be configured for security and to access all resources of the peer group. For example, the firewall of the new computing device may be opened to the peer group. The new computing device may also be enabled for network discovery and for resource sharing. The existing computing device residing on the peer group will circulate credentials to the new computing device, and in embodiments, a local user account will be created on the new computing device.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims

The invention claimed is:

1. One or more computer storage media having computer-executable instructions embodied thereon for performing a method for configuring a peer group, wherein an existing user device is a member of the peer group, the peer group resides on a subnetwork, and the subnetwork is a home location of the existing user device, the method comprising:
   determining that a new user device is located on the subnetwork and that the new user device has designated the subnetwork as a home location;
   sending a request to join the peer group to the new user device, wherein the peer group includes one or more computing devices that share an internet protocol (IP) address;
   challenging the new user device for a passkey;
   receiving the passkey from the new user device;
   determining whether the received passkey is correct; and
   when the passkey received from the new user device is correct and the new user device has designated the subnetwork as the home location, allowing the new user device to join the peer group.

2. The computer storage media of claim 1, wherein the method further comprises creating credentials on the new user device.

3. The computer storage media of claim 1, wherein the invitation is sent by the existing user device.

4. The computer storage media of claim 1, wherein the existing user device challenges the new user device for the passkey.

5. The computer storage media of claim 1, wherein the method further comprises accessing resources within the peer group.

6. The computer storage media of claim 5, wherein the resources comprise one or more computer readable media.

7. The computer storage media of claim 5, wherein the resources include one or more printing devices.

8. A computer system with computer readable media for performing computer-executable instructions embodied thereon, the system comprising:
   an existing user device in a peer group residing on a subnetwork, wherein the subnetwork is a home location of the existing user device and the peer group includes one or more computing devices that share an internet protocol (IP) address; and
   a new user device residing on the subnetwork and designating the subnetwork as the home location of the new user device,
   wherein the existing user device determines that the new user device has designated the subnetwork as the home location, authenticates a passkey received from the new user device via an authorization layer and allows the new user device to join the peer group, and wherein a communications layer connects the new user device to the peer group.

9. The computer system of claim 8, wherein the authorization layer authenticates the new user device by challenging the new user device for the passkey.

10. The computer system of claim 8, wherein the communications layer allows the new user device to access shared resources from the peer group.

11. The computer system of claim 10, wherein the shared resources are associated with the existing user device.

12. The computer system of claim 10, wherein the shared resources include one or more computer readable media.

13. The computer system of claim 10, wherein the shared resources include one or more printing devices.

14. The computer system of claim 8, wherein the communications layer communicates an invitation to the new user device to join the peer group.

15. The computer system of claim 14, wherein the new user device accepts the invitation to join the peer group.

16. One or more computer storage media having computer-executable instructions embodied thereon for performing a method for configuring a new user device to join a peer group, the method comprising:

designating a subnetwork as a home location;

receiving a request to join a peer group of computing devices from an existing user device in the peer group, wherein the peer group includes one or more computing devices that share an internet protocol (IP) address and a network connection, the peer group resides on the subnetwork, and the subnetwork is designated as the home location of the existing user device;

sending an acceptance to the request to the existing user device;

receiving a challenge for a passkey from the existing user device;

sending the correct passkey to the existing user device;

joining the peer group with the existing user device;

receiving credentials associated with the peer group;

creating a local user account that includes a username and a password, wherein the local user account allows the new user device to maintain an association with the peer group regardless of a particular user utilizing the new user device; and sharing resources with the peer group and the existing user device associated with the peer group, wherein the resources include one or more of a printing device and a computer-readable media.

* * * * *